(12) United States Patent
Coulter et al.

(10) Patent No.: US 8,308,109 B2
(45) Date of Patent: Nov. 13, 2012

(54) AIRCRAFT STRUCTURE

(75) Inventors: Steven Coulter, Bristol (GB); Simon King, Bristol (GB)

(73) Assignee: Airbus Operations Limited, Bristol (GB)

( * ) Notice: Subject to any disclaimer, the term of this patent is extended or adjusted under 35 U.S.C. 154(b) by 723 days.

(21) Appl. No.: 12/458,664

(22) Filed: Jul. 20, 2009

(65) Prior Publication Data

US 2010/0127120 A1   May 27, 2010

(30) Foreign Application Priority Data

Aug. 19, 2008 (GB) .................................. 0815020.3

(51) Int. Cl.
*B64C 1/00* (2006.01)
(52) U.S. Cl. ..................................... 244/131; 244/123.1
(58) Field of Classification Search .................. 244/131, 244/123.1, 213, 215, 117 R
See application file for complete search history.

(56) References Cited

U.S. PATENT DOCUMENTS

| | | | |
|---|---|---|---|
| 3,594,851 A | | 7/1971 | Swatton |
| 4,172,575 A | * | 10/1979 | Cole ............................ 244/216 |
| 4,395,007 A | * | 7/1983 | Owl, Jr. ....................... 244/215 |
| 4,892,274 A | * | 1/1990 | Pohl et al. ..................... 244/213 |
| 2002/0100840 A1 | | 8/2002 | Billinger |
| 2009/0134281 A1 | * | 5/2009 | Engelbrecht et al. ......... 244/215 |

FOREIGN PATENT DOCUMENTS

| | | |
|---|---|---|
| EP | 0 052 240 | 5/1982 |
| EP | 0 909 705 | 4/1999 |
| EP | 1 619 117 | 1/2006 |
| EP | 1 787 905 | 11/2006 |
| FR | 1 000 161 | 2/1952 |
| GB | 524280 | 8/1940 |
| GB | 555 514 | 8/1943 |
| GB | 2 362 363 | 11/2001 |
| GB | 2 402 914 | 12/2004 |
| WO | WO 2007/096624 | 8/2007 |

OTHER PUBLICATIONS

Search Report for GB 0815020.3 dated Dec. 17, 2008.
Search Report for GB 0815020.3 dated Apr. 23, 2009.

* cited by examiner

*Primary Examiner* — Timothy D Collins
*Assistant Examiner* — Jamie S Stehle
(74) *Attorney, Agent, or Firm* — Nixon & Vanderhye P.C.

(57) ABSTRACT

An aircraft control surface mounting structure including a cantilever rib mounted to a spar, the rib includes a first arm and a second arm both orientated to be substantially parallel to the line of flight of the aircraft.

9 Claims, 4 Drawing Sheets

AIRCRAFT STRUCTURE

This application claims priority to British Application No. 0815020.3 filed 19 Aug. 2008, the entire contents of which is hereby incorporated by reference.

FIELD OF THE INVENTION

The present invention relates to a structure for mounting aircraft control surfaces. More specifically, the present invention relates to a cantilever rib for mounting a flap from a rear spar of a wing.

BACKGROUND OF THE INVENTION

Control surfaces are used on aircraft to influence the passage of fluid over various flight surfaces such as wings. By "control surfaces" we mean movable components that produce an aerodynamic effect for example flaps, slats, ailerons and spoilers. Flaps, for example, are a type of control surface which are mounted to the rear of a wing and can be rotated with respect to the wing trailing edge to change the shape of the aerofoil profile of the wing assembly as a whole. This helps prevent wing stall at low speeds (e.g. during landing) when the flaps are fully deployed, and increases efficiency of the wing at high speeds (e.g. during cruise) when the flaps are stowed.

Control surfaces such as flaps need to be securely mounted to the aircraft. Flaps can be mounted to the wings of the aircraft in a variety of ways, for example via an underslung beam attached to the underside of the aircraft wing, or via a cantilever rib mounted directly to, and projecting perpendicularly from, a rear spar of the wing.

Both of these methods require that the beam or rib project from the outer mean line (OML) of the wing due to the fact that the desired pivot axis of the flap is below the OML. As such, the beam or rib will necessarily project into the fluid stream across the flight/control surfaces. This increases drag and hence reduces the efficiency of the aircraft which is undesirable.

In addition such beams or ribs need to be large enough to provide a load path from the flap to the wing as well as house actuators for deployment of the flap. As such they are often large.

The problem of control surface structure drag is particularly prevalent in large fixed wing aircraft in which the wings are swept to increase aerodynamic efficiency. The trailing edge of the wing, is non-perpendicular to the line of flight, and hence the direction of flap deployment is also non-perpendicular to the line of flight (rather it is parallel to the trailing edge of the wing). The beam or rib is mounted perpendicularly to both the trailing edge of the wing (i.e. the rear spar) and the leading edge of the flap. Specifically, it spans the shortest distance between them.

This is problematic as the beam or rib is non-parallel to the line of flight in swept wings. As such the "footprint" of the beam or rib viewed in the direction of the line of flight is relatively large due to its orientation. This further increases the effects of drag on the beam or rib.

It is known to cover these components in an aerodynamic fairing to reduce the drag produced, however this cannot completely eliminate it.

It is an object of the present invention to provide an improved mounting structure.

SUMMARY OF THE INVENTION

According to a first aspect of the present invention there is provided an aircraft control surface mounting structure comprising a body, the body having a main axis, a first attachment means defined at a first end of the body for attachment to a fixed structure of an aircraft and a second attachment means defined at a second end of the body for attachment to an aircraft control surface, the second attachment means defining a control surface pivot axis, wherein the control surface pivot axis is at a non-perpendicular angle to the main axis of the body.

According to a second aspect or the invention there is provided an aircraft control surface mounting structure comprising a body, the body having a main axis, a first attachment means defined at a first end of the body for attachment to a fixed structure of an aircraft and a second attachment means defined at a second end of the body for attachment to an aircraft control surface, the first attachment means being arranged to mount the body to the fixed structure of the aircraft such that the main axis of the body is at a non-perpendicular angle thereto.

Advantageously, by moving the axes away from a perpendicular relationship, the main axis can be adjusted to be more aligned, and even parallel with the line of flight of the aircraft. As such, the "footprint" of the body (such as a beam or rib) is reduced, and the drag is also reduced.

It will be understood that by "main axis" we mean an axis normal to the shortest two dimensions of the body.

According to a third aspect of the invention there is provided an aircraft control surface mounting system comprising a body and a linear actuator, in which the body has a pivot attachment for pivotably mounting an aircraft control surface about a control surface pivot axis, the actuator has an actuation axis, is mounted to the body at a first end of the actuator and has a control attachment at a second end of the actuator for mounting an aircraft control surface thereto, such that actuation of the actuator pivots the control surface about the pivot axis, wherein the pivot axis and the actuation axis are non-perpendicular with respect to each other.

Movement of the actuation axis also reduces the "footprint" of the flap control system, thus reducing drag.

According to a fourth aspect of the invention there is provided an aircraft defining a main longitudinal axis, the aircraft comprising a wing defining a swept edge, the wing having a control surface proximate the swept edge, the wing further comprising a control surface mounting structure arranged to attach the control surface to the wing, which mounting structure defines a main axis and in which the mounting structure is oriented such that the main axis is substantially parallel to the main longitudinal axis of the aircraft.

An example mounting structure will now be described with reference to the accompanying figures in which:

BRIEF DESCRIPTION OF THE DRAWINGS

FIG. 4a is an underside view of a first cantilever rib in accordance with the present invention, and, FIG. 4b is an underside view of a cantilever rib arrangement including the rib of FIG. 4a.

DETAILED DESCRIPTION OF THE PREFERRED EMBODIMENT

Figure 1:
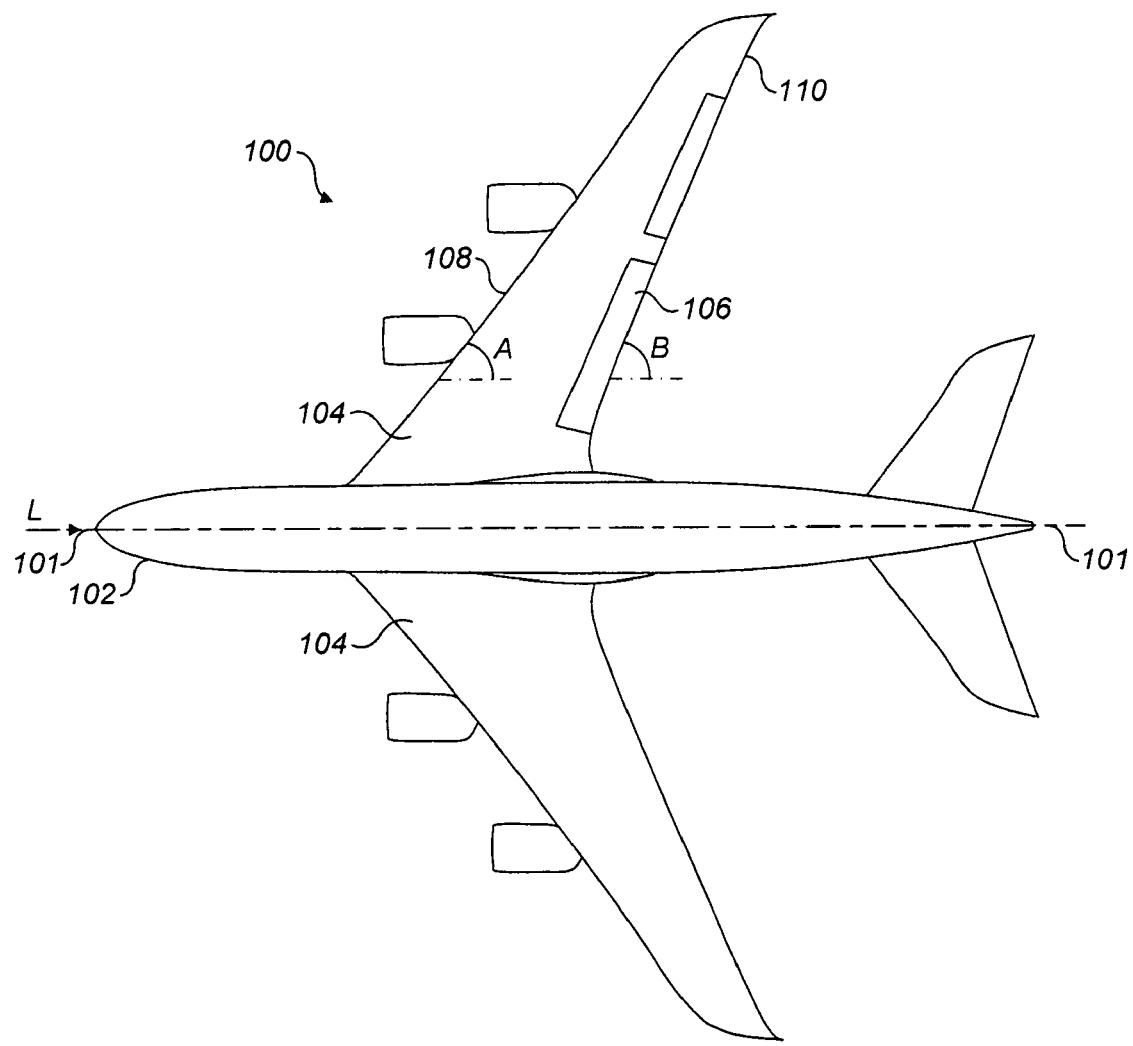
FIG. 1 is a plan view of an aircraft.

Referring to FIG. 1, a passenger aircraft 100 comprises a fuselage 102 and wings 104. The aircraft 100 defines a main longitudinal axis 101 parallel to the line of flight L. Each wing comprises at least one flap 106 which can be selectively deployed or stowed as known in the art.

It should be noted that as is commonplace with modern aircraft, the wings 104 are swept. Each wing comprises a leading edge 108 and a trailing edge 110, each of which have a different angle (A, B respectively) with respect to the main axis 101. The sweep angle of each edge is 90-A and 90-B respectively (0 degrees being an unswept wing). The sweep angle is typically 20 to 40 degrees.

Figure 2:
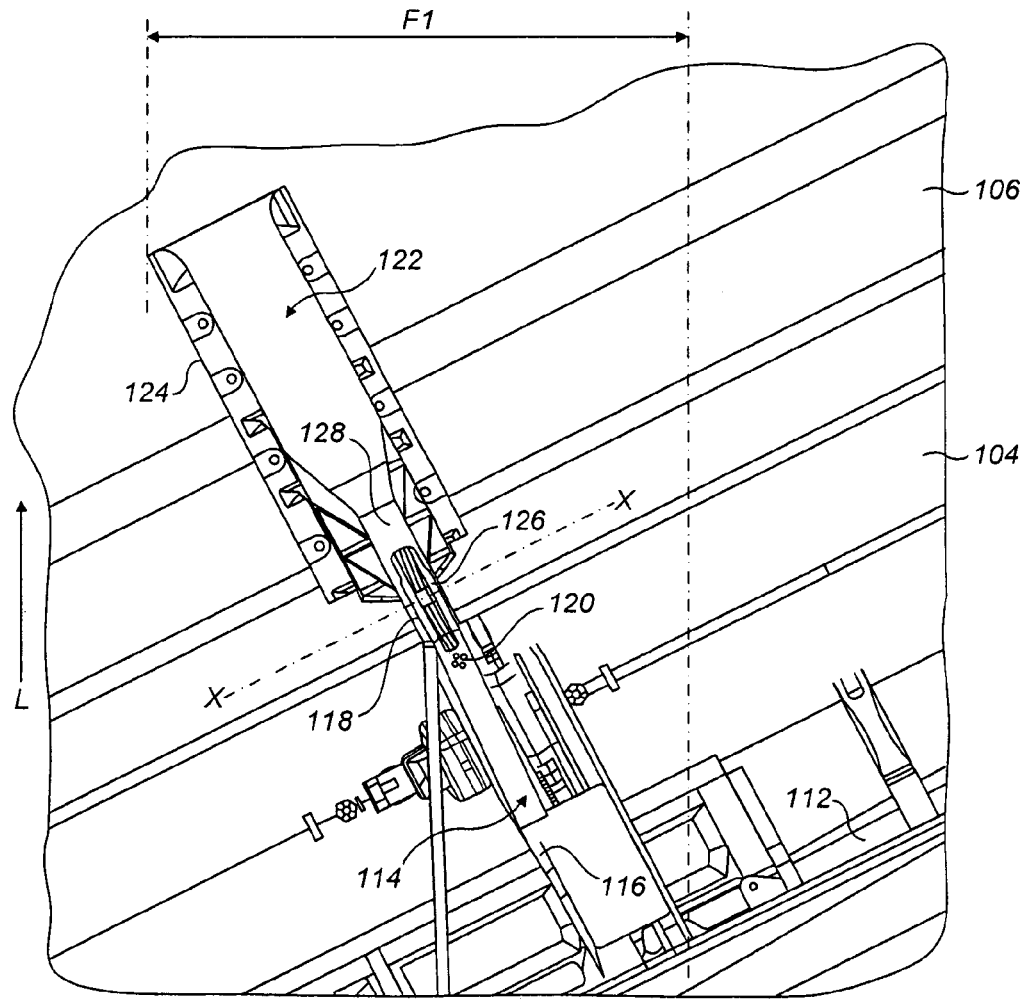
FIG. 2 is an underside view of a conventional flap deployment mechanism.

Referring to FIG. 2, the underside of the wing 104 is shown in the region of the flap 106. The wing 104 comprises a rear spar 112 to which a cantilever rib 114 is mounted at a first end 116. The cantilever rib 114 projects perpendicularly to the rear spar 112.

The cantilever rib 114 defines a first pivot mount 118 at a second end 120. The first pivot mount 118 defines a control surface pivot axis X.

The flap 106 comprises a flap mount 122. The flap mount 122 is attached to the flap 106 at a first end 124 and defines a second pivot mount 126 at a second end 128.

The first pivot mount 118 and the second pivot mount 126 engage to form a hinge or joint about the control surface pivot axis X. As such, the flap 106 is rotatable about the control surface pivot axis X relative to the wing 104.

It should be noted that the second end 120 of the cantilever rib 114 and the second end 128 of the flap mount 122 project significantly below the outer mean line (OML) of the aerodynamic surface of the wing 104 and flap 106 when in its stowed position (i.e. when it is substantially in line with the wing 104). As such, the mechanism generally projects into the flow of the working fluid under the wing 104.

It will be appreciated that the lateral width of the arrangement comprising the cantilever rib 114 and the flap mount 122 when viewed in the direction of the line of flight (LOF), F1, is significant. As such, a fairing of significant width is required to house the arrangement and thus significant drag is created reducing the efficiency of the aircraft.

Figure 3A:
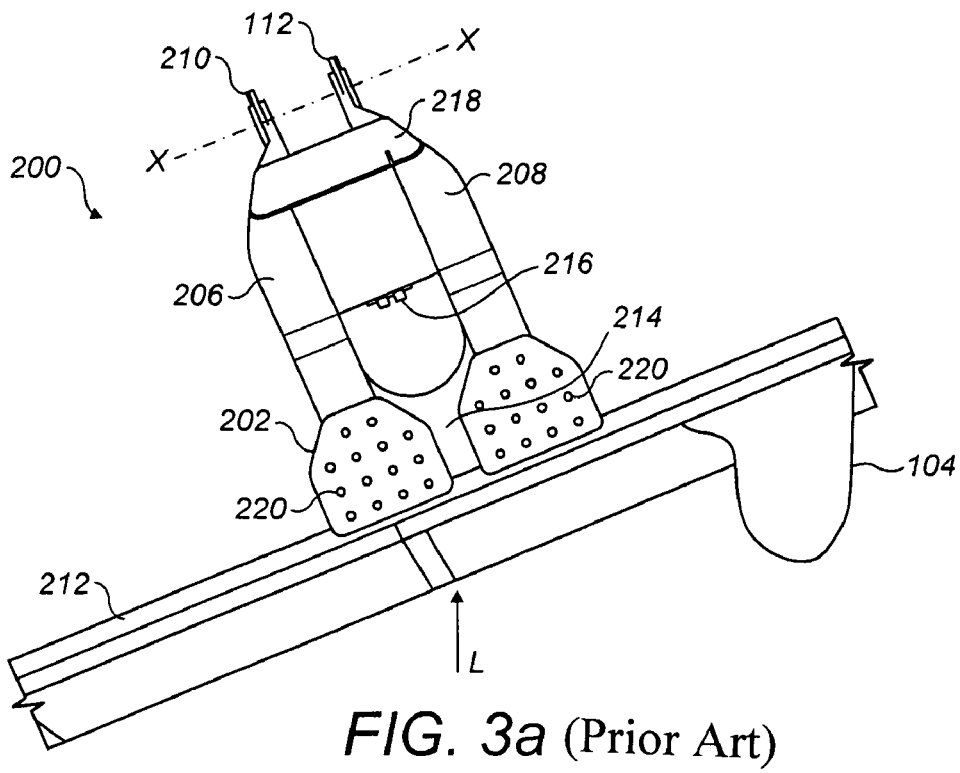
FIG. 3a is an underside view of a cantilever rib.

Referring to FIG. 3a, an alternative cantilever rib 200 to that of FIG. 2 is shown. The cantilever rib 200 is attached to a rear spar 112 of the wing 104 (shown cut-away).

A first load distribution plate 202 and a second load distribution plate 204 are attached to the rear spar 112 (for example by mechanical fixing means such as bolts) and project rearwardly therefrom. A further pair of load distribution plates are provided on the upper side of the arrangement (not shown).

The rib 200 comprises a first rib arm 206 and a second rib arm 208 parallel to, and offset from, each other. Each rib arm 206, 208 comprises a pivot mount 210, 212 respectively. The rib arms 206, 208 are substantially identical and arranged to mirror each other. Cross braces 214, 216 and 218 join the rib arms 206, 208 and retain them in their relative orientation.

The rib arms 206, 208 are spot welded to the load distribution plates 202, 204 via welds 220 such that the beam 200 projects perpendicularly from the spar 112. The pivot mounts 210, 212 are aligned to define a pivot axis X. A flap (not shown in FIG. 3a) can be mounted to the wing 104 to pivot about the pivot axis X.

Figure 3B:
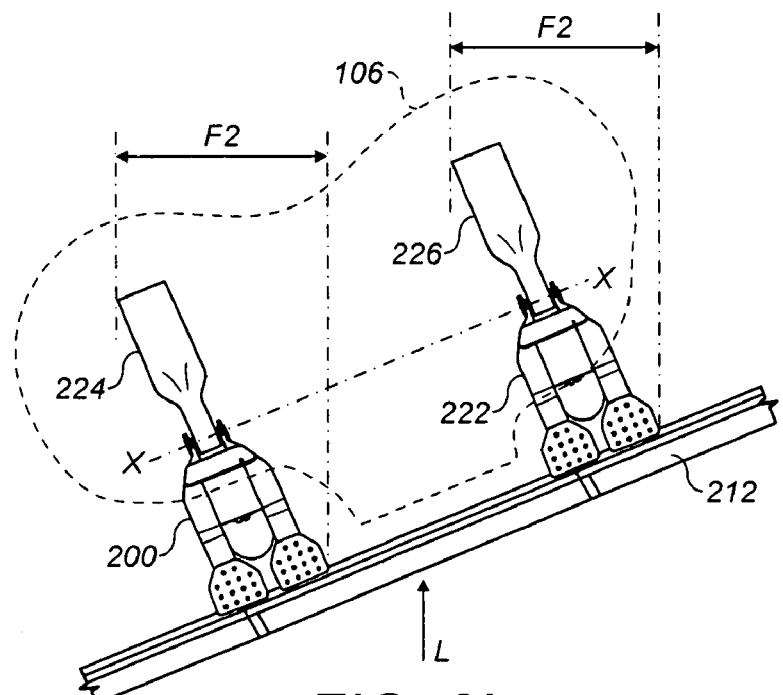
FIG. 3b is an underside view of a cantilever rib arrangement.

Referring to FIG. 3b, two ribs 200, 222 are shown mounted onto the same spar to support a flap 106 via flap mounts 224, 226. As shown, the footprint F2 in the direction of the LOF is significant.

It will be understood that the cantilever ribs form the main support and hinge points for the flap 106.

Figure 4A:
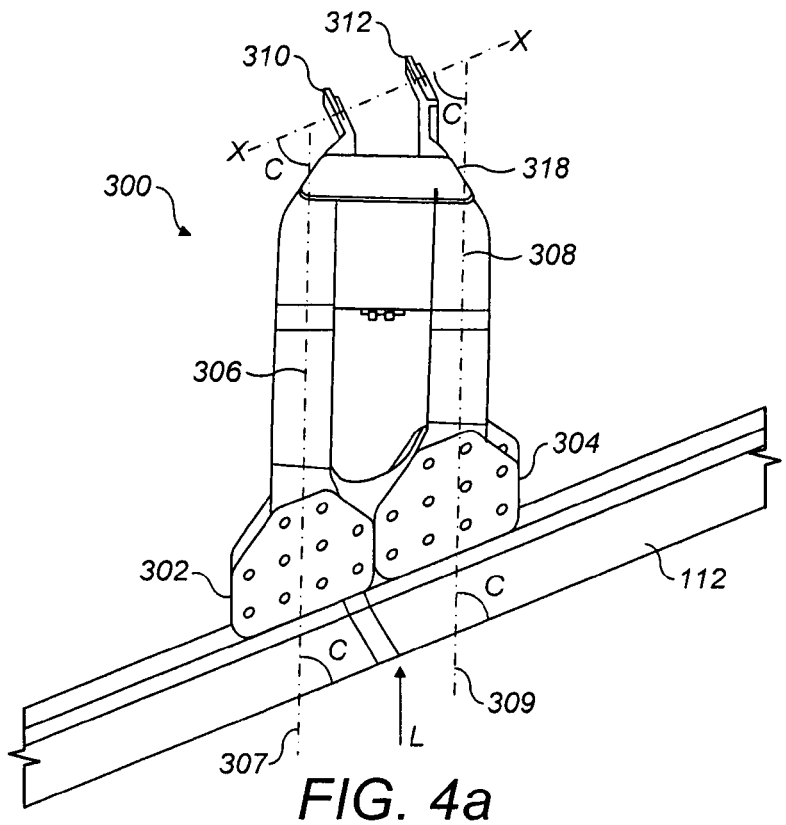
Figure 4B:
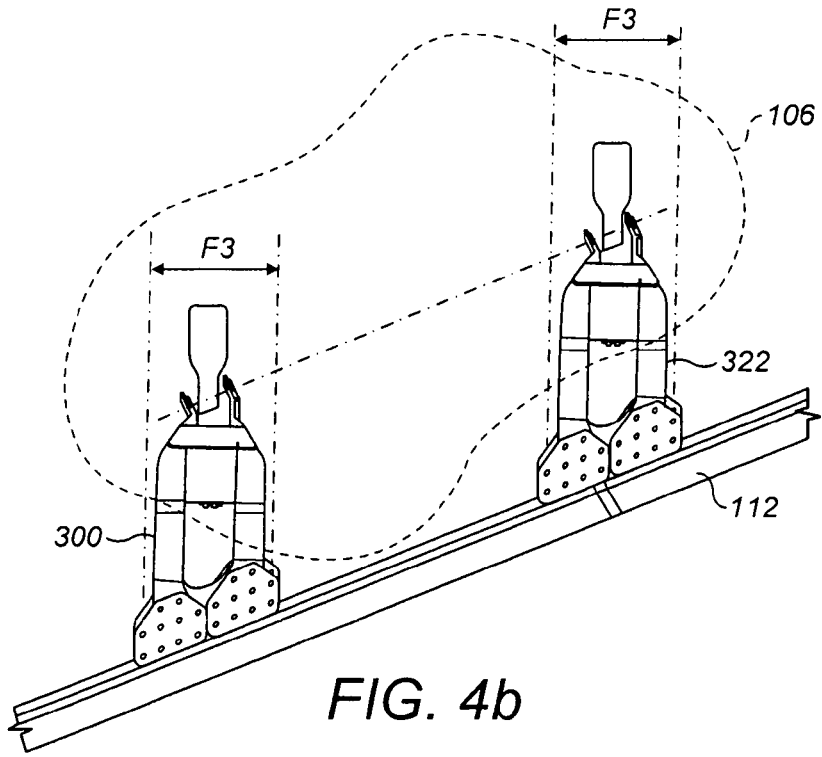

FIGS. 4a and 4b show a cantilever rib 300 and a cantilever rib arrangement components similar to cantilever rib 200 numbered 100 greater.

The rib arms 306, 308 are orientated with their long axes 307, 309 respectively at an angle C to the spar 112. Angle C is such that each of the arms 306, 308 and hence the rib 300 is oriented in the direction of the line of flight, L. Specifically, angle C=angle B (i.e. the sweep angle of the trailing edge 110 of the wing 104).

Like rib arms 206, 208 of the rib 200, the rib arms 306, 308 comprise pivot mounts 310, 312. A cross-brace 318 between the rib arms 306, 308 is also provided.

It should be noted that the geometry of the rib 300 differs from that of the rib 200. The pivot mounts 210, 212 are oriented to rotate about an angle to the main axes 307, 309 of the rib arms 306, 308 such that the pivot axis X is substantially parallel to the spar 112.

Furthermore, the load distribution plates 302, 304 are shaped to account for the non-perpendicular orientation of the rib arms 306, 308 with respect to the spar 112.

Referring to FIG. 3b, it can be clearly seen that the footprint F3 of the arrangement is significantly less than the footprint F2. As such, a fairing of lower lateral width can be used and hence drag is reduced.

Cantilever ribs are often assembled with actuators for moving the flap between deployed and stowed positions. It will be appreciated that the actuator will therefore be oriented in the same direction as the rib (i.e. non-perpendicular to the spar) and as such will be non-perpendicular to the pivot axis. This may require that a sliding joint is required at the point at which the actuator joins the flap to take account of any relative motion. The sliding joint will allow relative motion between the actuator and flap in a direction parallel to the pivot axis during deployment/stowage.

Variations of the above embodiments fall within the scope of the present invention. The concept is equally applicable to other aircraft control surfaces such as slats, rudders and ailerons.

The invention claimed is:

1. An aircraft control surface assembly for a swept aircraft, said swept aircraft having at least one control surface having a swept edge in which airflow direction is not orthogonal to the swept edge, said control surface assembly comprising:
   a body having a main axis oriented parallel to said airflow direction,
   a first attachment means, located at a first end of the body, for attachment to a fixed structure of said aircraft; and
   a second attachment means, located at a second end of the body, for attachment to said at least one control surface, the second attachment means defining a control surface pivot axis with respect to said fixed structure, said pivot axis is substantially parallel with said swept edge.

2. An aircraft control surface assembly according to claim 1 in which the control surface pivot axis is at an angle in the range of 50 to 70 degrees to said airflow direction.

3. An aircraft control surface assembly according to claim 1 in which the pivot axis is positioned to lie outside an aerodynamic profile of the fixed structure.

4. An aircraft control surface assembly according to claim 1 comprising a linear actuator having an actuation axis, the actuator being mounted to the body at a first end and having a control attachment at a second end of the actuator for mounting an aircraft control surface thereto, such that actuation of the actuator pivots the control surface about the pivot axis, wherein the actuation axis is parallel to the airflow direction.

5. An aircraft control surface assembly according to claim 4 in which the control attachment is configured to be movably mounted to the control surface to permit relative movement between the control attachment and the control surface.

6. A swept aircraft wing having a rear wing spar and an aircraft control surface assembly according to claim 1 mounted thereto at the first attachment means.

7. A swept aircraft wing according to claim 6 in which the wing defines a line of flight parallel to said airflow direction, and the main axis of the body is parallel to the line of flight.

8. A swept aircraft wing according to claim 6 in which the control surface pivot axis is parallel to the rear spar.

9. An aircraft control surface assembly according to claim 1 in which the aircraft control surface is a flap and the body is a cantilever flap support rib.

* * * * *